US010969762B2

(12) United States Patent
Hornung et al.

(10) Patent No.: US 10,969,762 B2
(45) Date of Patent: Apr. 6, 2021

(54) CONFIGURING A HAZARD ZONE MONITORED BY A 3D SENSOR

(71) Applicant: SICK AG, Waldkirch (DE)

(72) Inventors: Armin Hornung, Waldkirch (DE); Matthias Neubauer, Waldkirch (DE); Ingolf Braune, Waldkirch (DE); Shane MacNamara, Waldkirch (DE); Thomas Neumann, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/432,262

(22) Filed: Jun. 5, 2019

(65) Prior Publication Data
US 2019/0377322 A1 Dec. 12, 2019

(30) Foreign Application Priority Data
Jun. 7, 2018 (EP) ..................................... 18176458

(51) Int. Cl.
| | |
|---|---|
| *G05B 19/406* | (2006.01) |
| *G06T 7/80* | (2017.01) |
| *G06T 7/521* | (2017.01) |
| *G06T 7/593* | (2017.01) |
| *H04N 13/239* | (2018.01) |
| *H04N 7/18* | (2006.01) |

(52) U.S. Cl.
CPC ............ *G05B 19/406* (2013.01); *G06T 7/521* (2017.01); *G06T 7/593* (2017.01); *G06T 7/80* (2017.01); *H04N 7/181* (2013.01); *H04N 13/239* (2018.05); *G05B 2219/50193* (2013.01); *G06T 2207/30232* (2013.01)

(58) Field of Classification Search
CPC ........... G05B 2219/50193; G05B 2219/37631; G05B 19/4061; B25J 9/1676
See application file for complete search history.

(56) References Cited

U.S. PATENT DOCUMENTS

| | | | |
|---|---|---|---|
| 6,829,371 B1 | 12/2004 | Nichani et al. | |
| 9,131,121 B2* | 9/2015 | Matsudo | ................. H04N 7/18 |
| 9,501,692 B2* | 11/2016 | Tyagi | ................. G06K 9/00771 |
| 10,302,251 B2* | 5/2019 | Merx | ........................ G05B 9/02 |
| 2009/0015663 A1* | 1/2009 | Doettling | .................. F16P 3/14 |
| | | | 348/46 |

(Continued)

FOREIGN PATENT DOCUMENTS

| | | |
|---|---|---|
| DE | 102012007242 A1 | 9/2013 |
| DE | 102005063217 B4 | 5/2014 |

(Continued)

OTHER PUBLICATIONS

European Search Report dated Nov. 25, 2018 issued in corresponding European Application No. 18176458.0.

*Primary Examiner* — Boubacar Abdou Tchoussou
(74) *Attorney, Agent, or Firm* — Nath, Goldberg & Meyer; Jerald L. Meyer

(57) ABSTRACT

A method of configuring at least one hazard zone to be monitored by at least one three-dimensional (3D) sensor includes fixing outer surfaces, where the at least one hazard zone is a volume defined by the outer surfaces, and is a zone in which a machine to be secured is located. Additionally, a check is made during the configuration or after the configuration whether the outer surfaces are visible to the at least one 3D sensor.

15 Claims, 7 Drawing Sheets

(56) References Cited

U.S. PATENT DOCUMENTS

Figure 1:
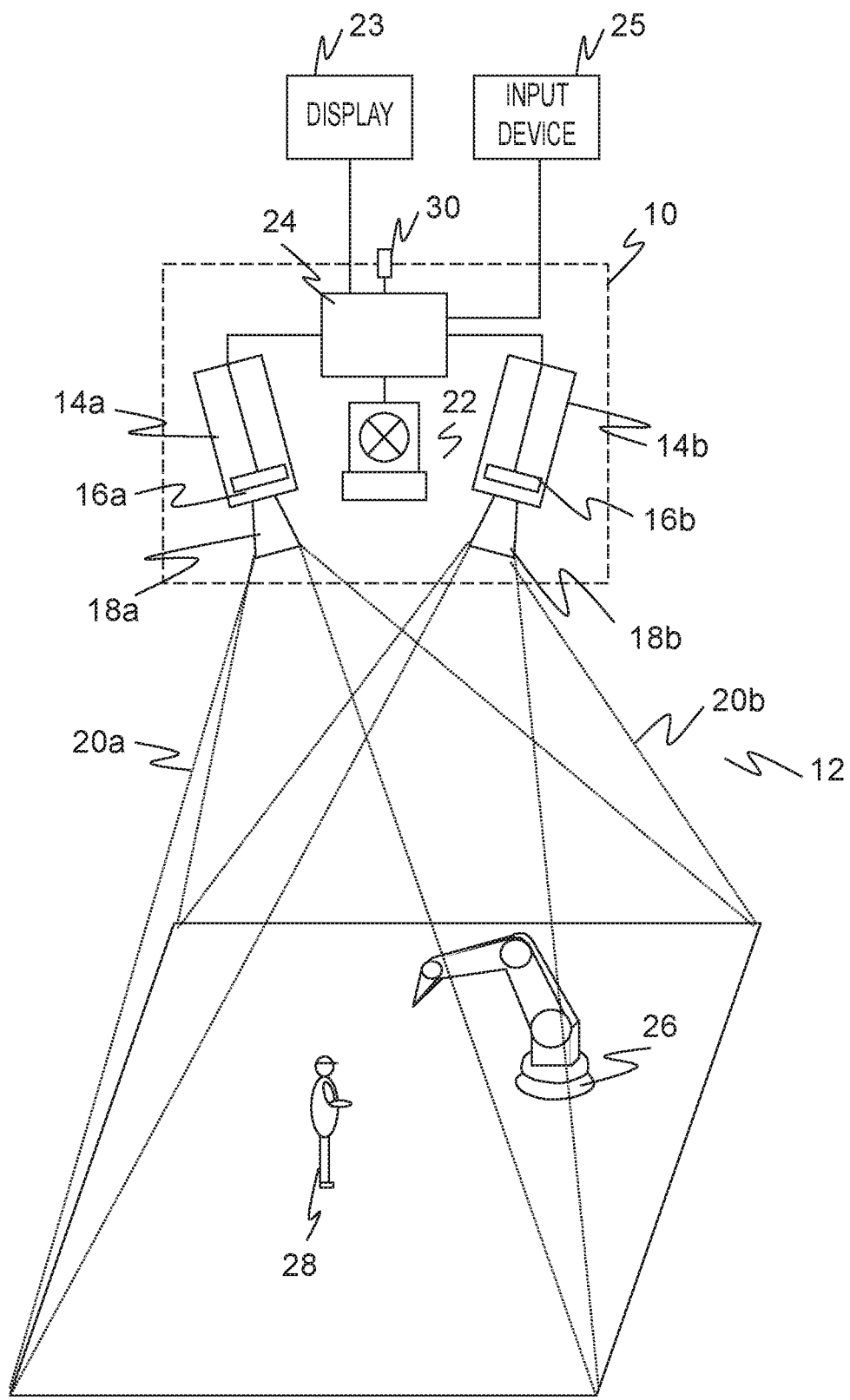

| | | | | |
|---|---|---|---|---|
| 2012/0123563 A1* | 5/2012 | Drinkard | ............... | F16P 3/144 |
| | | | | 700/13 |
| 2013/0094705 A1* | 4/2013 | Tyagi | ............... | G06K 9/00369 |
| | | | | 382/103 |
| 2013/0321636 A1* | 12/2013 | Matsudo | ............... | H04N 7/18 |
| | | | | 348/152 |
| 2016/0040827 A1* | 2/2016 | Merx | ............... | G05B 9/02 |
| | | | | 700/79 |
| 2018/0336402 A1* | 11/2018 | Takahashi | ............ | G06K 9/00342 |

FOREIGN PATENT DOCUMENTS

| | | | |
|---|---|---|---|
| EP | 2023160 | B1 | 8/2007 |
| EP | 2048557 | B1 | 3/2013 |
| EP | 3142088 | A1 | 3/2017 |
| EP | 3189947 | A1 | 7/2017 |

\* cited by examiner

CONFIGURING A HAZARD ZONE MONITORED BY A 3D SENSOR

The invention relates to a method of configuring at least one hazard zone to be monitored by at least one 3D sensor, wherein the hazard zone is a volume defined by outer surfaces to secure at least one machine; and wherein the outer surfaces are fixed by the configuration. The invention further relates to an apparatus for configuring a hazard zone to be monitored by a 3D sensor.

The primary goal of safety engineering is to protect persons from hazard sources such as, for example, machines in an industrial environment represent. The machine is monitored with the aid of sensors and accordingly, if a situation is present in which a person threatens to come dangerously close to the machine, a suitable securing measure is taken.

3D sensors are inter alia used for the monitoring. They initially include 3D cameras in different technologies, for example stereoscopy, triangulation, time of flight, or evaluation of the interference of passive two-dimensional patterns or of projected illumination patterns. Such 3D sensors, in contrast to a conventional two-dimensional camera, record images that include a distance value in their pixels. These depth-resolved or three-dimensional image data are also called a depth map. Laser scanners are furthermore known that scan in two directions or in all three directions and that likewise detect three-dimensional image data over the respective scanning angles and the measured distance. The higher instrument and evaluation effort for generating three-dimensional image data in comparison with a two-dimensional image detection is justified by the additional information in a number of applications.

Sensors used in safety technology or for the protection of persons have to work particularly reliably and must therefore satisfy high safety demands, for example the standard EN13849 for safety of machinery and the machinery standard IEC61496 or EN61496 for electrosensitive protective equipment (ESPE). To satisfy these safety standards, a series of measures have to be taken such as a safe electronic evaluation by redundant, diverse electronics, functional monitoring, or especially monitoring of the contamination of optical components. It is typically required in safety engineering applications that an object having a specific minimum size or specific minimum dimensions is reliably recognized. This property is called a detection capability.

The common securing concept provides that protected fields are configured that may not be entered by operators during the operation of the machine. If the sensor recognizes an unauthorized intrusion into the protected field, for instance a leg of an operator, it triggers a safety directed stop of the machine.

There is an increasing desire for closer cooperation with persons (HRC, human-robot collaboration) in the safety engineering monitoring of robots. Relevant standards in this connection are, for example, ISO 10218 for industrial robots or ISO 15066 for collaborative robots. Protected fields and safety distances should be as small as possible in HRC and should possibly even be configured in a situation adapted manner, naturally with the proviso that safety is maintained. Standards ISO13854, ISO 13855, and ISO 13857 deal with the establishment of safety distances.

An evaluation of objects and machines with respect to speed and to mutual distance is called "speed and separation monitoring" in said robot standards. It is expediently not the distance from the machine itself that is measured here. This would be too complex and too dynamic and a sufficient safety distance from future machine positions should also be observed. It is therefore sensible to configure a hazard zone that surrounds the machine.

However, in accordance with the methods known for this purpose, the configuring person is not supported as to whether the configuration is safe. If, however, masked areas and shadows are ignored that a configured hazard zone causes, the safety function can also suffer because of this because objects cannot be seen from the perspective of the monitoring sensor or suddenly disappear in the hazard zone. The configuring person is left alone with the responsibility that a configuration provides the desired safety.

DE 10 2005 063 217 B4 discloses a method of configuring protected fields for a stereo camera. A three-dimensional image of the spatial area is recorded and displayed for this purpose and volumes that should be monitored as protected fields are defined therein in a kind of CAD environment. However, no automatic check is then made whether the sensor can actually detect these protected fields.

In addition, different demands are made on the configuration depending on whether it should be recognized when an object has entered into a spatial volume such as a protected field or whether the distance from a spatial volume such as a hazard zone is to be determined.

In DE 10 2012 007 242 A1, a hazardous area around a robot is monitored by a recognition system. The term hazard area there, however, actually designates a protected field since it is permitted to approach the hazard area at will, but not to enter it. No configuration of the hazard area takes place; it rather dynamically adapts to the movements of the robot or of a person in its surroundings. The extent to which the hazard area can respectively be detected by the recognition system is not automatically checked.

EP 2 023 160 B1 discloses a three-dimensional spatial monitoring using a configuration mode to determine the protected fields with reference to visual markers. Movement routines of a hazard source are monitored in this process and a protected field is automatically configured therefrom. It is consequently here also a question of protected fields and not of hazard zones and whether the protected fields can actually be monitored is also not automatically checked.

On a configuration of an optoelectronic sensor in accordance with EP 2 048 557 B1, protected field boundaries are predefined using a handheld device, with a check being made whether the handheld device is respectively seen by the sensor. This again relates to protected fields and not to hazard zones and it does not work virtually in a 3D environment, but only in the actual monitored zone. The masking or shading by a hazard zone around the machine to be monitored remains out of consideration since the visibility of the handheld device cannot provide sufficient information on this during the configuration.

U.S. Pat. No. 6,829,371 B1 deals with an automatic configuration of an optical safety curtain using a boundary pattern for a protected field in the scene. Apart from the fact that it is again a question of protected fields and not hazard zones, the three-dimensional situation is not sufficiently assessed by such two-dimensional borders.

In accordance with U.S. Pat. No. 9,403,025 B2, the working speed of a robot is reduced when a person is present in a hazard zone around the robot. This is again a different understanding of the term of a hazard zone that corresponds to a protected field. In addition, U.S. Pat. No. 9,043,025 B2 is silent on the configuration of the hazard zone or even its checking with respect to its safe detectability.

US 2015/0217455 A1 follows objects in the environment of a robot that should react when a new, not previously detected object appears there. The problem of masking by the robot is not discussed.

EP 3 112 900 A1 discloses a safety system that estimates the volume taken up by a detected object and that underlies a risk assessment. This relates to the object to be detected, that is to the person, and not to the machine to be monitored.

In US 2016/0140397 A1, two-dimensional video data and depth data are evaluated to track objects and to detect events, but with no protected fields or hazard zones being configured.

US 2016/0207198 A1 presents a method of verifying safety zones. The safety zones are here displayed in an augmented reality representation on a mobile device. This can help the configuring person to evaluate the safety zones, but otherwise leaves all the responsibility to him. In addition, nothing is said on the question of the extent to which the safety zones can be monitored by a sensor.

EP 2 275 990 B1 deals with gaps in the depth map. A safety directed shutdown command takes place when there are gaps or when there are contiguous pixel regions without gaps that are each larger than the smallest object to be detected, with the size of a gap being projected to the margin under the assumption of the worst case. This is an additional safety measure that, however, has nothing to do with the configuring of protected fields or hazard zones.

EP 3 200 122 A1 discloses a 3D sensor with a safe recognition of objects in which the depth map is evaluated by a fine and by a coarse detection capability. Finely detected objects within an environment of a coarsely detected object are assigned to it, isolated finely detected objects are ignored as interference. This makes it possible to still filter small objects determined downstream as not safety relevant, but likewise has no direct relationship with the configuring of protected fields or hazard zones.

It is therefore the object of the invention to improve the configuration of hazard zones for their 3D monitoring.

This object is satisfied by a method and by an apparatus for configuring at least one hazard zone to be monitored by at least one 3D sensor in accordance with the respective independent claim. The hazard zone secures at least one machine and is monitored by a 3D sensor so that no-one is injured by the machine. The machine is here preferably at least partly in the hazard zone. A hazard zone is a volume defined by its outer surfaces, that is a 3D spatial region. Hazard zones can also be composed of a plurality of overlapping or disjunctive volumes. The outer surfaces are fixed by the configuration in accordance with the invention, preferably by preparing a data record that describes the configured hazard zone and that the 3D sensor or a higher ranking system uses for the monitoring.

The outer surfaces are therefore decisive because monitoring is carried out in operation as to whether a person is dangerously approaching the machine and this is where the border zone counts. A 3D body can naturally nevertheless be directly configured that implies the fixing of its outer surfaces. It is in particular the lateral side surfaces that prevent crawling under and reaching over by sufficient dimensioning. In this respect, a preferred installation of the 3D sensor with a bird's eye view is assumed linguistically without actually restricting the invention thereto.

The invention starts from the basic idea that it is ensured by the configuration that the hazard zone is suitable for a safe monitoring. A check is made for this purpose whether outer surfaces are visible to at least one 3D sensor. All the outer surfaces can be checked, but preferably only a subset thereof, for example the lateral side surfaces. Generally, monitored outer surfaces can be fixed as the subset of the outer surfaces, either by an automatic process or by user input and the monitored outer zones are those that are checked for visibility. Other outer surfaces are mechanically secured, for example, and are therefore not monitored outer surfaces.

Visible here means a free view in the sense of a direct monitoring possibility of the total area. An outer surface at the rear from the perspective of the 3D sensor can in contrast also be observed through the hazard zone in a certain sense, but this is not necessarily visible in the sense of the invention, because the machine impedes the view in a very unforeseeable manner. It is consequently by no means sufficient if an outer surface is located somehow in the field of view. The 3D sensor or an association of a plurality of 3D sensors that complement one another in the field of vision and/or perspective can therefore carry out its/their work reliably with hazard zones configured in accordance with the invention.

The invention has the advantage that safety problems due to masking or shadow are avoided from the start with hazard zones configured in this manner. The configuring person is automatically supported and cannot configure any hazard zone that is unpermitted in this sense or he at least receives a clear indication of possible safety problems. A great flexibility of the configurable hazard zones remains within this framework. Hazard zones are thereby possible that are in close contact with the actual hazard and with which the availability of the system remains high and distances of objects are not underestimated by too much. The method is also suitable for a plurality of hazard zones for securing of complex machines and plant and/or for a plurality of 3D sensors that complement one another in an association.

The 3D sensor is preferably a 3D camera that can initially be any known technique such as a time of flight principle with a direct time of flight measurement of light signals or a phase measurement or a distance estimate from brightness levels or focal positions (DFF depth from focus; DFD, depth from defocus). The 3D camera particularly preferably uses a triangulation principle, however, in which two camera images of a moving camera or of a stereo camera are correlated with one another or alternatively an illumination pattern is correlated with a camera image to thus estimate disparities and to determine distances therefrom. A laser scanner is also a 3D sensor since it produces 3D point clouds that are limited to one scanning plane with a classical laser scanner. This restriction with a laser scanner is lifted by a scan moving in elevation or by a plurality of scanning beams set into elevation. Hybrid arrangements having different 3D sensors or other sensors such as a light grid are likewise conceivable.

At least one polygonal chain is preferably specified on a base surface for the configuring of outer surfaces, in particular a closed polygonal chain, and a prism having perpendicular outer surfaces is generated therefrom. The specification of the polygonal chain on the base surface is only a linguistic simplification since the polygonal chain is the same at every height with a prism having perpendicular side surfaces. A good compromise is found via a polygonal chain or a prism that can be automatically generated therefrom, that permits simultaneously flexible, sufficiently complex configuration possibilities for hazard zones, and that in so doing is substantially better to master from a technical safety aspect than any 3D volume.

Such hazard zones described by prisms having perpendicular side surfaces are also easier to comprehend and to test for the configuring person. The prism is preferably not a parallelepiped and/or not a triangular column. Such simple hazard points should admittedly be expressly configurable and in no way prohibited. It is only a question of an optional restricted term understanding of a polygonal chain and of the prism fixed by it that actually makes use of the more flexible and more complex design possibilities. Hazard zones can be composed of a plurality of prisms that are specified over a plurality of polygonal chains.

An outer surface can preferably be visible to a 3D sensor when the 3D sensor is disposed at the other side of the hazard zone with respect to the plane in which the outer surface is disposed. This is an advantageous condition that is simple to check as to whether an outer surface is visible. It is sufficient if one 3D sensor in an association of a plurality of 3D sensors satisfies this condition. The outer surface is notionally extended in all directions to form a plane. The hazard zone itself is on the one side of this plane, that is inward so-to-say. If the 3D sensor is on the other side, that is outward, the total outer surface thereof is freely visible. Formally, the normal vector to the outer surface can be determined and can be compared with a vector from the position of the 3D sensor to the outer surface. They should be oriented opposite one another, that is, for example, the sign of their scalar product should be negative. This observation can also take place in only two dimensions in a perpendicular projection to a plane in parallel with the base surface.

Hazard zones may preferably only be configured with contact with the ground. Contact with the ground is here preferably to be understand in the sense of the standards so crawling underneath and access from the ground are not possible. A small distance from the ground, in particular corresponding to the detection capability of the 3D sensor, can remain since this is not relevant to technical safety. A specific value for such an uncritical distance from the ground satisfying the standard is 300 mm. In hazard zones with contact with the ground, also in said extended sense, a shadow toward the bottom does not have to be taken into account. If suspended hazard zones are alternatively permitted, the projective shadow region of the hazard zone is preferably counted toward it. The projective shadow region is that region that is shaded for the 3D sensor from its central perspective through the hazard zone. As described further below, a great advantage of hazard zones configured in accordance with the invention is that distances can be determined without taking account of projective shadows of the hazard zone. However, this is only possible when the hazard zone is configured with contact with the ground; with a suspended hazard zone, safety has to be reestablished by taking account of the projective shadow.

An outer surface that is not visible to at least one 3D sensor is preferably marked or is even not permitted during the configuration. This makes the work of the configuring person substantially easier since a configuration of invalid hazard zones does not occur at all. There can, however, also be the possibility of non-activated outer surfaces of a hazard zone, i.e. of outer surfaces for whose securing an additional 3D sensor or another measure such as a physical barrier or a light grid is required. Such safety problems or gaps in the monitoring are immediately detectable by the configuring person.

When configuring an outer surface not visible to at least one 3D sensor, an alternative outer surface is preferably automatically suggested. This is, for example, an outer surface that is visible and has a minimal distance from an unpermitted outer surface, not visible, that the configuring person specifies. The configuring person thus particularly quickly arrives at an alternative, permitted configuration that comes close to his original plan.

When configuring an outer surface not visible to at least one 3D sensor, a changed perspective of a 3D sensor is preferably automatically suggested or a perspective of an additional 3D sensor is proposed so that the outer surface becomes visible. In this embodiment, the emphasis in remedying the problem of a non-visible outer surface is not approached in the configuration of the hazard zone, but rather in the 3D sensor arrangement. Where conceivably compatible with all the previously configured hazard zones, a new position and/or orientation of an already provided 3D sensor is changed. Otherwise an additional 3D sensor is added with whose help the configuration would be possible. Functions such as the proposal of an alternative outer surface or 3D configuration are preferably separately requested by the configuring person or can be switched off because they can otherwise above all be very disruptive at the start of a configuration.

The machine is preferably observed during its working movement to locate spatial regions comprising the hazard zone. Starting data are thereby provided that assist in the configuration of the hazard zone. It is then known which spatial regions are at least occupied by the machine at times and which are not.

The spatial regions to be covered are preferably shown as an aid to the configuration of the hazard zone. Such a representation takes place, for example, by fading in configuration software or by projection into the actually monitored zone. The configuring person is thus aware of the regions that the machine takes up and can adapt the hazard zone thereto.

A hazard zone is preferably configured automatically using the spatial regions to be covered. For example, a cumulated 3D point cloud of the machine is generated via its working movement with the aid of the 3D sensor or alternatively of another sensor. The 3D measurement points are projected onto the floor; an enveloping polygonal chain is formed and optionally its sections are rotated toward one of the observing 3D sensor so that the corresponding outer surface becomes visible. Non-visible outer surfaces remain here in dependence on the position of the 3D sensor and on the complexity of the machine and of its working movement. The configuring person has the possibility of further improving this in a subsequent processing by changes to the configuration and/or to the 3D sensor association, but is at least immediately aware of the safety gaps still present.

The at least one configured hazard zone is preferably monitored by the that least one 3D sensor, with objects in an environment of the hazard zone being detected from measured data of the 3D sensor, with the shortest distance between the hazard zone and the objects being determined, and with a decision being made with its aid as to whether a safety directed reaction of the machine takes place in the hazard zone. The hazard zone configured in accordance with the invention is thus used in a safety application. If a plurality of hazard zones are configured, the shortest distance from an object detected by the 3D sensor is preferably determined for each hazard zone. Detection data are suitably merged in a 3D sensor association. This can in particular take place at the processing step of shortest distances; each 3D sensor then works largely autonomously up to a very late processing stage. Alternatively, the measured data can also already be combined and evaluated together.

Only the shortest distances are preferably provided in a safety directed manner by the 3D sensor and the further evaluation takes place on this basis in a connected control. The control is higher ranking than the 3D sensor and than the monitored machine or the monitored machines or it is the control of the machine itself. The control evaluates the distances delivered by the 3D sensor and initiates a safety directed response where necessary. Examples for a securing are an emergency stop, a braking, an evading, or a putting into a safe position. It is conceivable to specify a fixed minimum distance that is, for instance, determined under worst case assumptions for speeds or from known or measure trailing distances. Dynamic safety distances, inter alia in dependence on the current speed of the machine and of the object, are also conceivable. Data of the control can enter into the safety evaluation.

Conventionally, only a binary signal is output via such an output interface as to whether a protected field infringement is present (OSSD, output signal switching device). In accordance with this preferred embodiment, protected fields are no longer monitored and binary securing signals are also no longer generated and output by the sensor itself. Instead, the information required for this is provided in a safe, very compact, and easily accessible manner. The respectively current shortest distance is provided instead of the previously customary binary securing signal at the safe output interface, that is consequently no longer designed as an OSSD, for a connected control. This control, for instance the higher ranking control of a robot cell or also the control of the robot itself, can very simply determine with respect to the shortest distance whether there is a hazard and takes over the actual securing function itself.

In this respect, work or the cooperation with machines becomes substantially more flexible in design and a fast, individual response to humans in the environment of the machine is made possible. An intrusion into a protected field as a rule only allows an emergency stop since protected fields are defined exactly such that in such a case there is a risk of an accident that is no longer differentiated due to the binary shutdown signal. However, milder intrusions in the process routine that avoid a time-intensive emergency stop together with a restart and that allow the process routine to continue to run without interference where possible or that integrate the approach of a human into the process routine are also possible by monitoring shortest distances. Worksteps of the machine can be replanned in good time here.

The shortest distance is preferably determined with respect to the outer surfaces without taking account of the projective shadow region of the hazard zone. This would generally not be safe. The projective shadow is actually defined as the region in which the 3D sensor is blind from its central perspective due to the shadow by the hazard zone. An object could thus still be far enough away from the hazard zone on entry into the projective shadow and then approach to a critical distance unseen in the projective shadow. The configuration of the hazard zone in accordance with the invention, however precludes this safety critical case from ever happening. The projective shadow takes up a substantial spatial volume and would have a corresponding influence on the availability so that it is a great advantage if it does not have to be taken into account during the monitoring. Objects in the hazard zone itself are preferably ignored in the monitoring of the hazard zone. The hazard area itself is therefore considered free of objects to be detected or rather as blocked by the machine. In fact, there would really be space for such objects depending on the configuration. The machine naturally also itself forms an object that is first detected by the sensor. All that is, however, intentionally ignored and the hazard zone is modeled as an empty block free of objects. This simplifies the monitoring and the determination of shortest distances since the dynamics of the machine within the hazard zone thus does not play any role. This is also unproblematic from a safety engineering aspect since each object is recognized in good time when it approaches the hazard zone.

Not only the projective shadow of the hazard zone on the side remote from the 3D sensor belongs to the hazard zone, but also a masked region on the facing side between the 3D sensor and the hazard zone. If namely the hazard zone is advantageously masked by technical calculation in the sense that sight rays in the hazard zone are ignored in total, the 3D sensor is also blind in the masked region. However, this is surprisingly uncritical with hazard zones configured in accordance with the invention; the masked region does not have to be separately treated. Objects in the masked region can rather be ignored without any loss of safety. An object that approaches the hazard zone namely contacts the hazard zone, depending on the height, due to its own projective shadow, at the bottom exactly when it contacts the masked region at the top. The dangerous approach is therefore always noticed in time.

The control and evaluation unit is preferably configured to provide at least one piece of additional information at the output interface, with the additional piece of information comprising at least one further shortest distance from other sections of the next object or other objects, an object position, a direction of movement, a speed, an object envelope, or an object cloud. A differentiated evaluation is thus made possible for a control connected to the 3D sensor. It is, for example, conceivable that it is not a slow next object that represents the greatest hazard, but rather a fast somewhat more remote object. The at least one additional shortest distance should relate to another object or to at least one clearly separate other object region such as another arm since otherwise only direct adjacent points from the shortest distance would be considered whose additional information contributes little new. Object positions are here preferably representative, for instance an object focus or that object point from which the shortest distance was calculated. It is, however, also conceivable to output bounding boxes for objects or the 3D point cloud of the object. All these pieces of additional information are preferably intermediate results that were anyway detected when locating the shortest distance or are parameters that can be derived therefrom that do not substantially increase the effort.

The 3D sensor is preferably configured for a detection capability in which objects are safely detected from a minimum size onward. The detection capability is a specified suitability of a sensor that is safe in the sense of the introductory standards or comparable standards to safely detect objects of a minimum size in the total monitored zone. The corresponding configuration of the 3D sensor relates to its design, that is to its optics, its light receiver, and further possible components, not yet named, such as lighting, and to the safe evaluation. The detection capability in the first instance does not preclude smaller objects from also being detected. However, protection is not guaranteed for objects that are smaller than the minimum size; for example, a finger is not reliably detected with a 3D sensor designed for arm protection. Objects smaller than the minimum size are therefore possibly excluded in the evaluation by means of filtering. It is also possible to select a minimum size above the detection capability, that is not to utilize a resolution provided per se. Numerical examples can be given as 14 mm for finger protection or in the range from 30-80 mm for the protection of extremities, in particular 55 mm for upper arm protection.

An apparatus for configuring at least one hazard zone to be monitored by at least one 3D sensor has an input device, a control and evaluation unit, and a display, wherein the control and evaluation unit is configured to fix outer surfaces of the hazard zone on the basis of inputs of the input device and to display them on the display to configure the hazard zone using a method in accordance with the invention. The configuration advantageously takes place with the help of software that runs in a 3D sensor, in a system connected thereto, or in a configuration system therefor. The configuration can take place on a standard screen, but also by means of virtual reality or by superposition of actual and virtual information (augmented reality).

Figure 2:
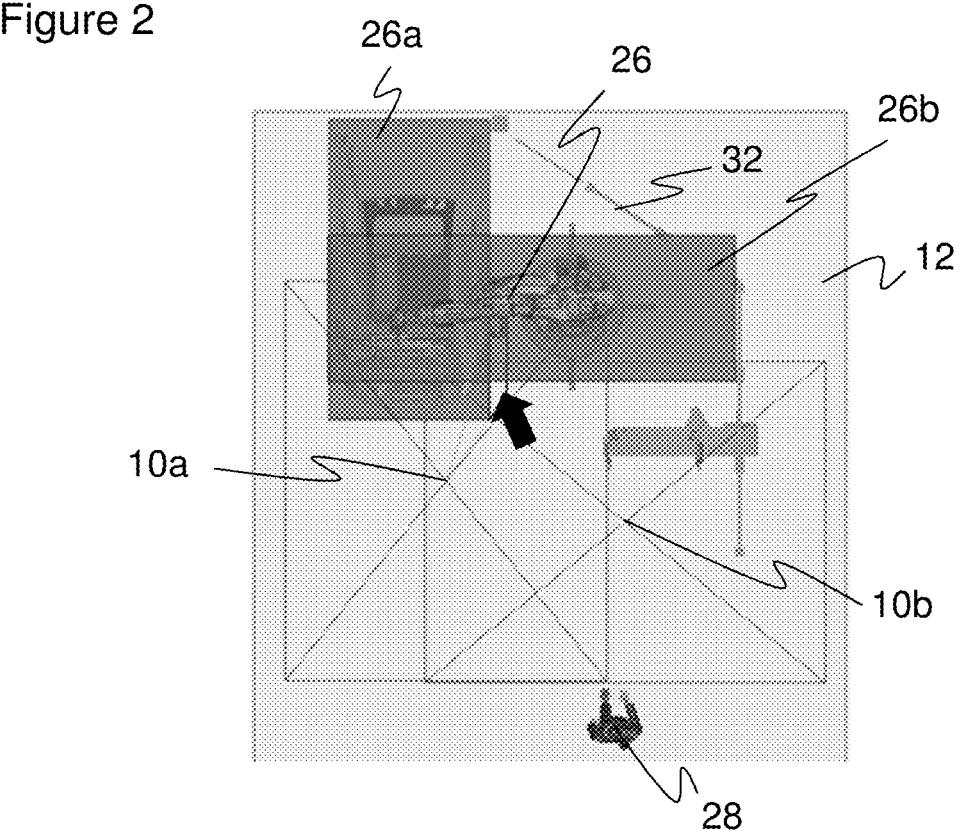
Figure 3:
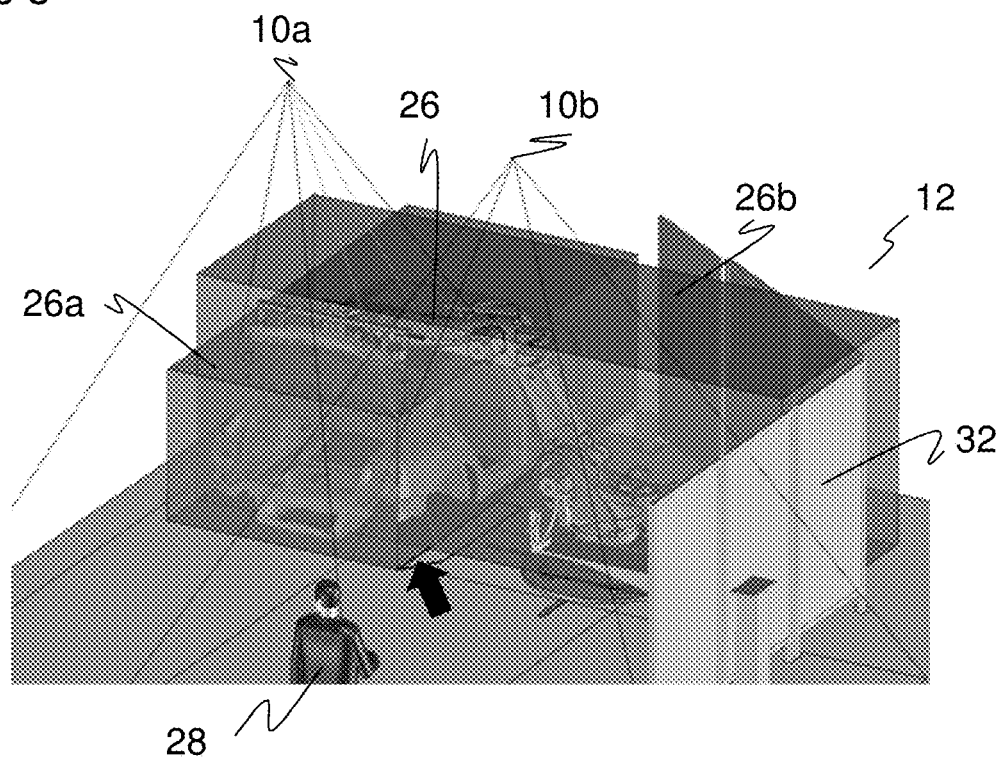
Figure 4:
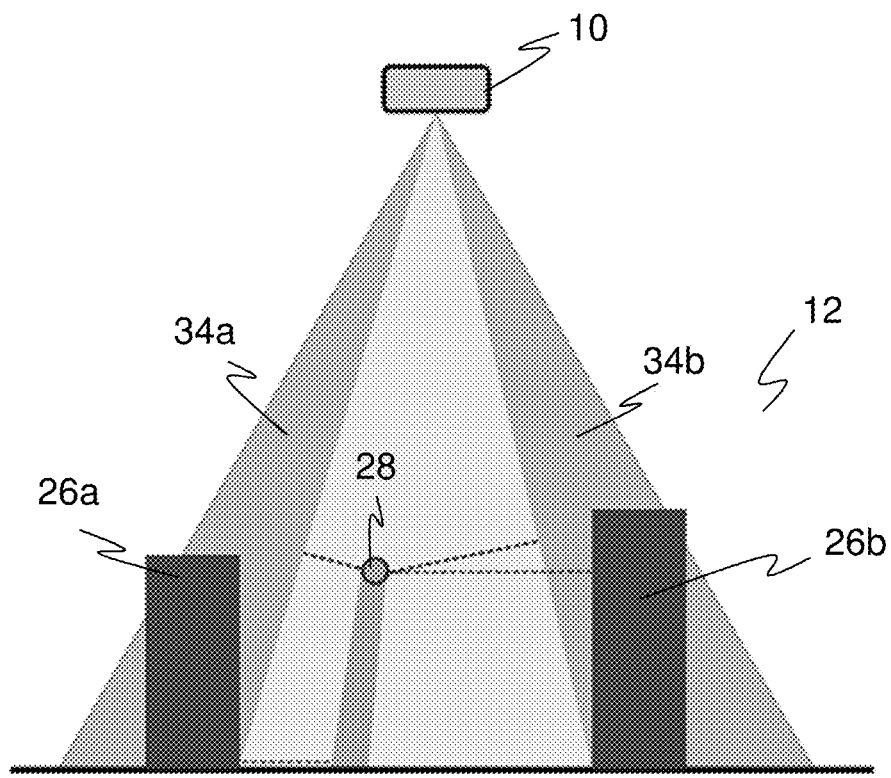
Figure 5:
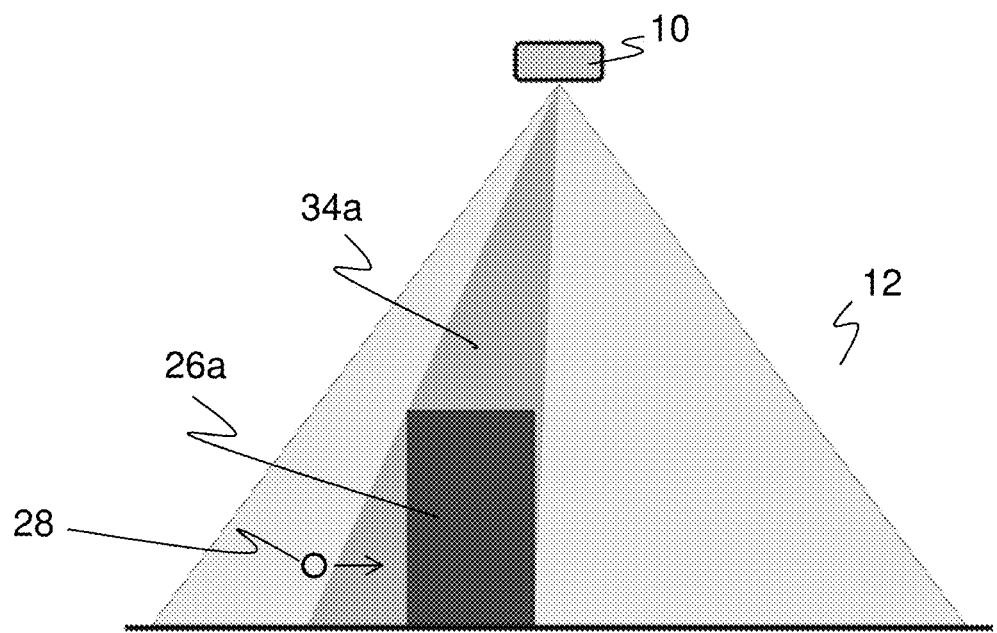
Figure 6:
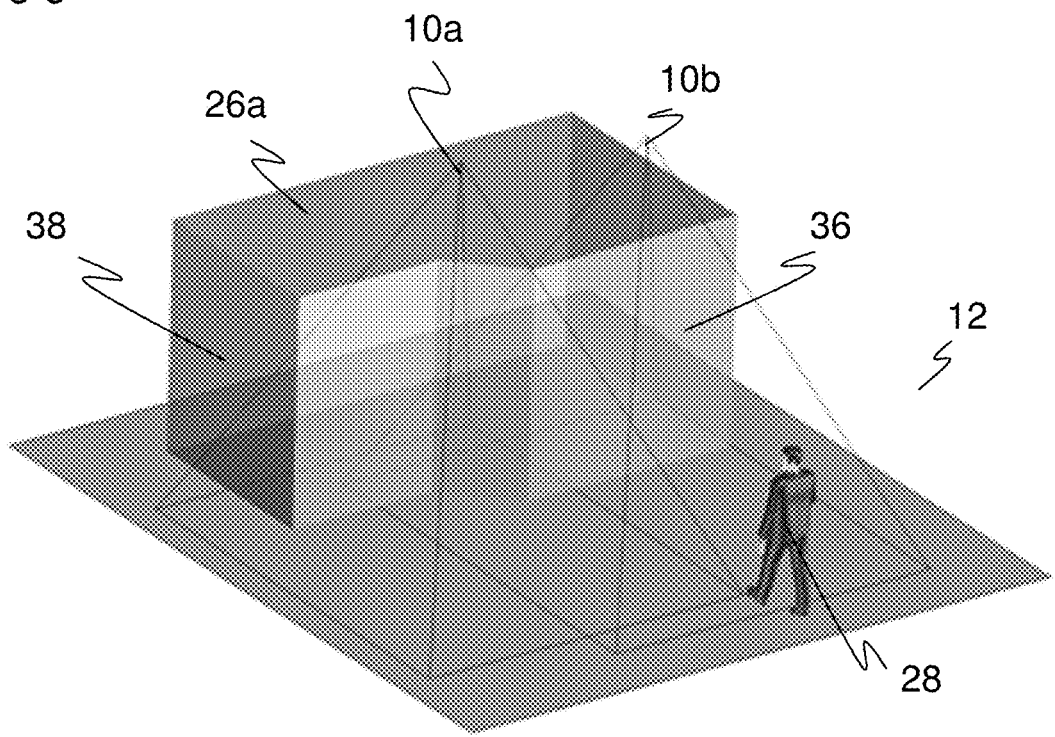
Figure 7:
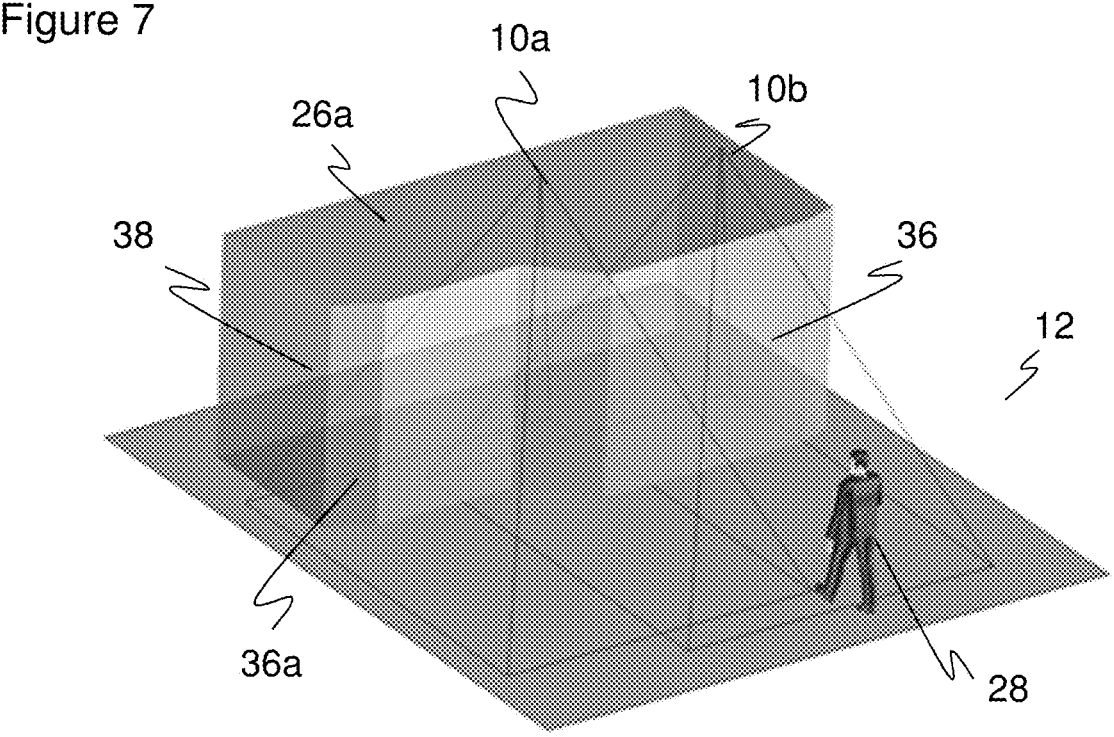
Figure 8:
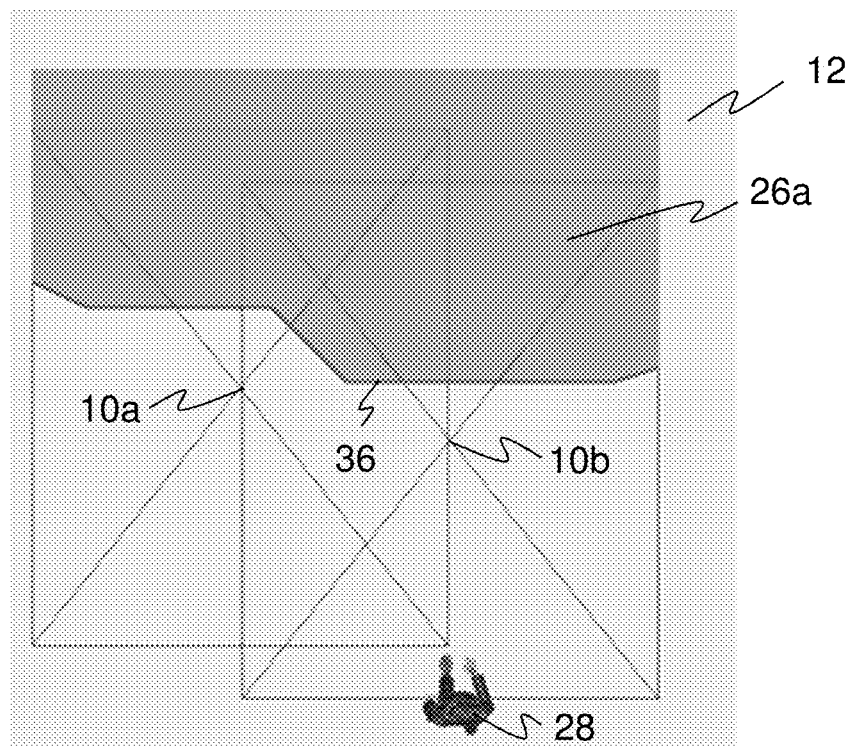
Figure 9:
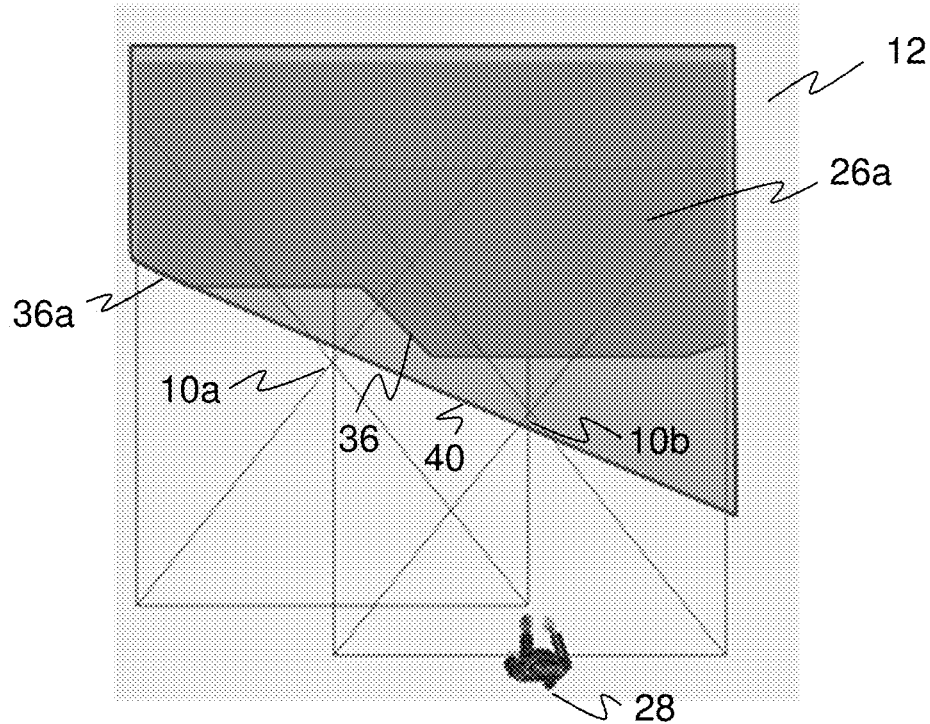
Figure 10:
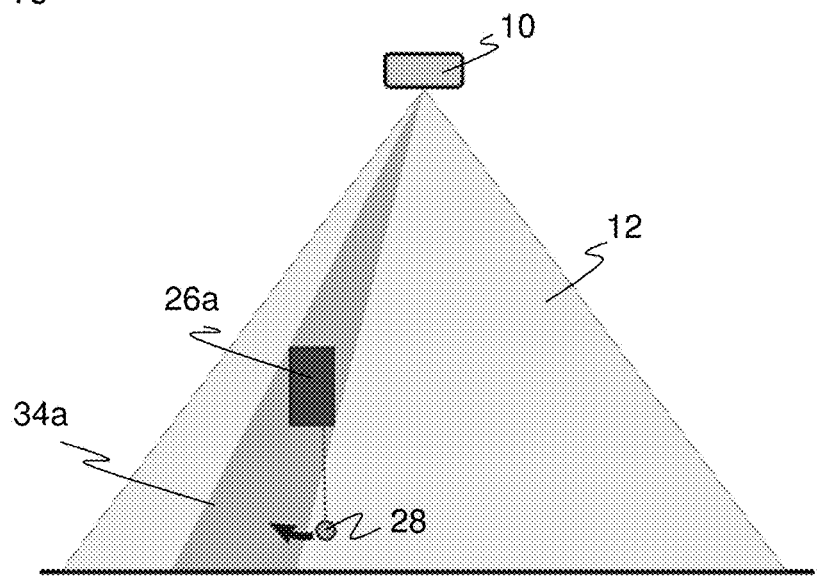
Figure 11A:
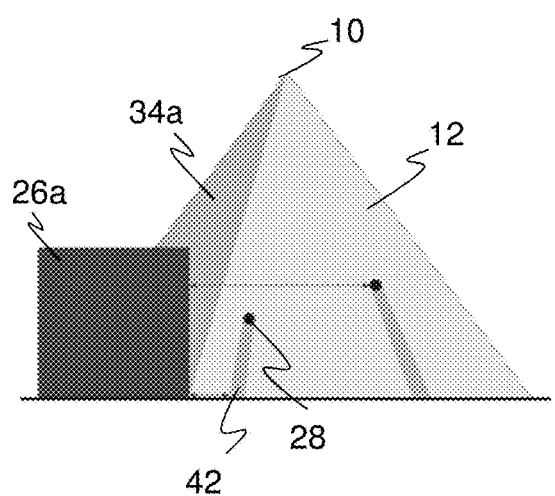
Figure 11B:
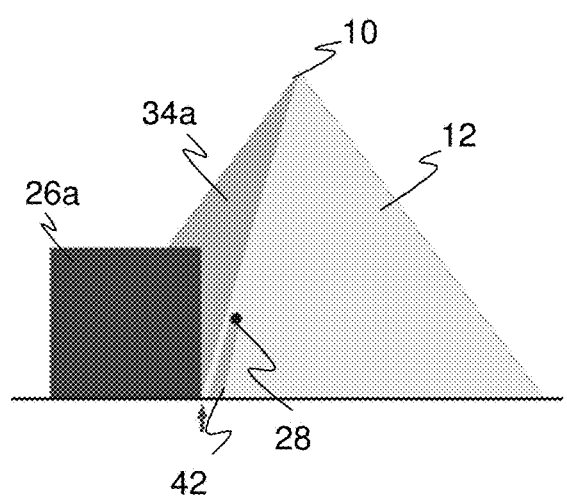
Figure 12:
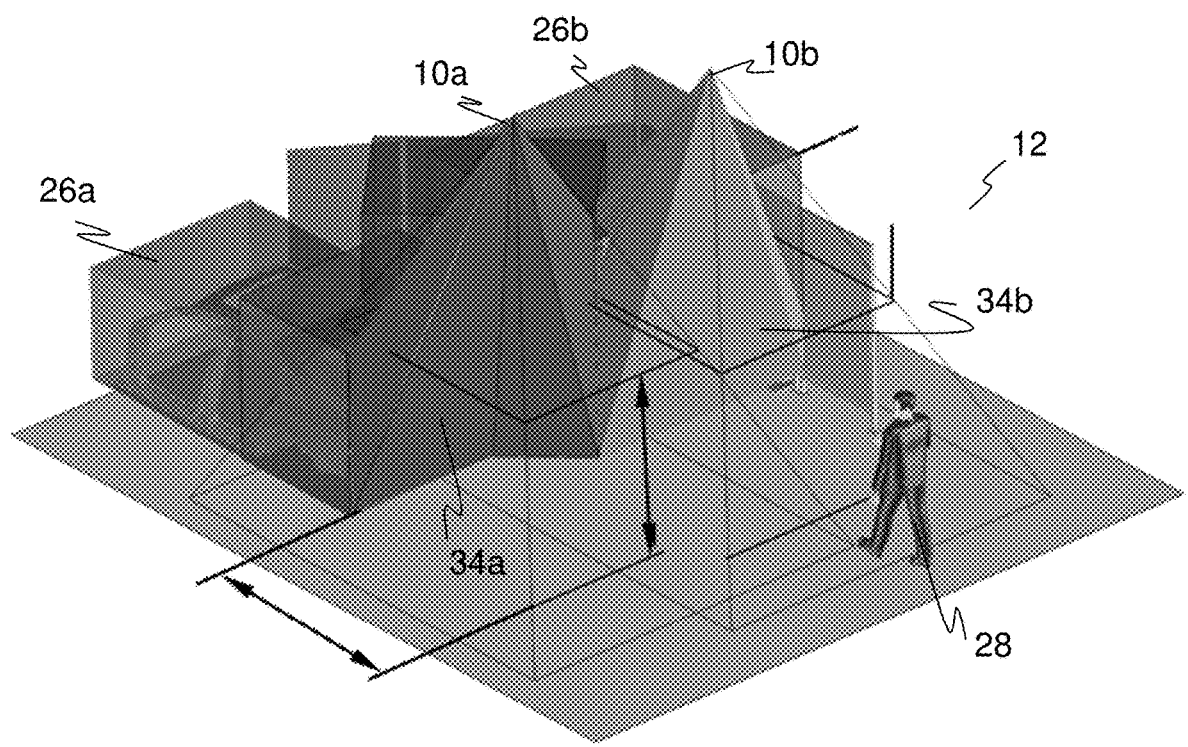

The invention will be explained in more detail in the following also with respect to further features and advantages by way of example with reference to embodiments and to the enclosed drawing. The Figures of the drawing show in:

FIG. 1 a schematic three-dimensional representation of a 3D camera and its monitored zone;

FIG. 2 an exemplary plan view of hazard zones around machines to be secured;

FIG. 3 a three-dimensional view for the situation of FIG. 2;

FIG. 4 a schematic side view of the field of vision of a 3D camera with two exemplary hazard zones to explain different distances from an object;

FIG. 5 a further schematic side view of the field of vision of a 3D camera to explain masking and shadows;

FIG. 6 a three-dimensional view of an exemplary configuration of a hazard zone with the outer surfaces visible to a 3D sensor;

FIG. 7 a three-dimensional view in which the configuration of the hazard zone in accordance with FIG. 6 was changed to make an additional part of an outer surface visible;

FIG. 8 a plan view of a configuration of a hazard zone by means of a polygonal chain on a base surface;

FIG. 9 a plan view in accordance with FIG. 8 with an additional half-plane by means of which the visibility of an outer surface is checked;

FIG. 10 a further schematic side view of the field of vision of a 3D camera for discussion of suspended hazard zones;

FIGS. 11*a-b* schematic side views of the field of vision of a 3D camera for discussion of a masked region between the hazard zone and the 3D camera; and FIG. 12 a three-dimensional view of hazard zones around machines to be secured that include masked regions and shadow regions.

FIG. 1 shows the general design of a stereo camera 10 for recording a depth map in a schematic three-dimensional representation. The stereo camera 10 is only an example for a 3D sensor in accordance with the invention with reference to which the detection of 3D image date will be explained. Different 3D cameras with detection principles such as a correlation of image and projected illumination patterns or determination of the time of flight and laser scanners would equally be conceivable.

To detect the spatial region 12, two camera modules 14*a*, 14*b* are mounted at a known fixed distance from one another therein and each take images of a spatial region 12. An image sensor 16*a*, 16*b*, usually a matrix-type imaging chip, is provided in each camera and records a rectangular pixel image, for example a CCD or a CMOS sensor. The two image sensors 16*a*, 16*b* together form a 3D image sensor for detecting a depth map. One objective 18*a*, 18*b* having an imaging optics is associated with each of the image sensors 16*a*, 16*b* respectively and can in practice be realized as any known imaging objective. The maximum angle of view of these optics is shown in FIG. 1 by dashed lines which each form a pyramid of view 20*a*, 20*b*.

An illumination unit 22 is provided between the two image sensors 16*a*, 16*b* to illuminate the spatial region 12 with a structured pattern. The stereo camera shown is accordingly configured for active stereoscopy in which the pattern also imparts evaluable contrasts everywhere to a scene that is structure-less per se. Alternatively, no illumination or a homogeneous illumination is provided to evaluate the natural object structures in the spatial region 12, which as a rule, however, results in additional aberrations.

An evaluation and control unit 24 is connected to the two image sensors 16*a*, 16*b*, a display 23, an input device 25, and the lighting unit 22. The control and evaluation unit 24 can be implemented in the most varied hardware, for example digital modules such as microprocessors, ASICS (application specific integrated circuits), FPGAs (field programmable gate arrays), GPUs (graphics processing units) or mixed forms thereof that can be distributed over any desired internal and external components, with external components also being able to be integrated via a network or cloud provided that latencies can be managed or tolerated. Since the generation of the depth map and its evaluation is very processing intensive, an at least partly parallel architecture is preferably formed.

The control and evaluation unit 24 generates the structured illumination pattern with the aid of the illumination unit 22 and receives image data of the image sensors 16*a*, 16*b*. It calculates the 3D image data or the depth map of the spatial region 12 from these image data with the aid of a stereoscopic disparity estimation. The total detectable spatial region 12 or also the working region can be restricted via a configuration, for example to mask interfering or unnecessary regions.

An important safety engineering application of the stereo camera 10 is the monitoring of a machine 26 that is symbolized by a robot in FIG. 1. The machine 26 can also be substantially more complex than shown, can consist of a number of parts, or can actually be an arrangement of a plurality of machines, for instance of a plurality of robots or robot arms. The stereo camera 10 is preferably configured in a failsafe manner for the safe detection of an object in the protection of persons in the sense of safety standards such as named in the introduction, in particular in accordance with IEC 61496-3.

The depth map is preferably first subjected to some pre-processing steps, for example a cutting out of the known background, in the control and evaluation unit 24 for the evaluation of where an object 28 shown as a person is located with respect to the machine 26. A recognition of the objects 28 in the spatial region 12 is then carried out, with demands being able to be made on relative objects 28, for instance a minimum size corresponding to a demanded detection capability. Filters using a body model for more robustness are also conceivable, for instance in the manner such that, as in EP 3 200 122 A1, finely detected objects are only relevant if they are located close to a coarsely detected object.

The shortest distance of the machine 26 from the next objet is subsequently calculated among the remaining objects 28. In the distance calculation, the projective shadow of the object 28 is taken into account, for example in that the shaded region is assumed as occupied by an object as a precaution. It is thus prevented that a safety relevant object 28 is overlooked in a shadow region not visible from the central perspective of the stereo camera 10. The respective current shortest distance is provided to a safe interface 30 cyclically or acyclically. Typical output rates are multiple times a second; however, a more infrequent updating is also conceivable depending on the required and possible response time of the stereo camera 10.

A higher ranking control connected to the safe interface 30 in particular that of the machine 26, evaluates the shortest distance for satisfying a safety function, for example a speed and separation monitoring in accordance with ISO/TS 15066 and for this purpose compares the shortest distance with a required safety distance, for instance in accordance with ISO 13855. The next workstep of the machine 26 is then replanned as required in dependence on the shortest distance or, in the hazard case, a safety directed reaction is initiated, for example to stop or brake the machine 26 or to cause it to evade, so that the required safety distance between man and machine is continuously maintained or the machine is set to a safe state. The reaction can, in addition to the shortest distance, depend on further conditions such as the speeds or the nature of the object 28 and the machine zone 26 of the impending collision.

According to the previous explanation, the machine 26 itself is observed and the shortest distance from it is determined. However, in practice, this is not done due to the design and dynamics that may be very complex under certain circumstances. The machine 26 is instead modeled as so-called hazard zones in accordance with the invention.

FIGS. 2 and 3 show for this purpose an exemplary scene in a plan view or in a three-dimensional representation. The monitoring here takes place by way of example by a sensor association of two 3D sensors 10*a-b*, for example stereo cameras as explained with reference to FIG. 1 that are only shown by their respective field of view pyramids. The use of two 3D sensors 10*a-b* is exemplary; a single sensor or a larger 3D sensor association can be used instead to expand the field of view or to gain additional perspectives. The 3D sensors 10*a-b* only secure toward the front; a physical barrier 32 prevents access from the right. Walls, further physical barriers, 3D sensors, or light grids for example, can complete the securing to the rear and to the left.

Two hazard zones 26*a-b* are configured around the machine 26 by way of example. The hazard zones 26*a-b* are spatial regions in which the machine 26 executes work movements in a respective time period. The hazard zones 26*a-b* can surround the machine 26 at a little distance to leave sufficient clearance for the work movements. In addition, it is advantageous for the calculations to geometrically define simple hazard zones 26*a-b*, for which purpose certain empty spaces can then be accepted. As also in FIGS. 2 and 3 surround, as required, a plurality of hazard zones 26*a-b*, a plurality of machines 26, and/or a plurality of movable part sections of a machine 26. Hazard zones 26*a-b* can be rigid and can comprise all conceivable work movements. Alternatively, respective hazard zones 26*a-b* are defined for part sections of the work movement that are utilized in a sequence corresponding to the process and that are smaller and are better adapted.

A hazard zone 26*a-b* itself is preferably considered free of objects 28 to be detected or rather as blocked by the machine 26. In fact, depending on the bounding box that models the machine 26 as a hazard zone 26*a-b*, there would easily be space for objects 28 therein. The machine 26 naturally also forms an object 28 itself that is first detected by the 3D sensors 10*-b*. The distinguishing between the machine 26 and the object 28 within the hazard zone 26*a-b* would, however, be extremely difficult and susceptible to error with the result that the distance of the machine 26 form itself is calculated and an unnecessary safety reaction thereupon takes place. The dynamics of the machine 26 within the hazard zone 26*a* do not play any role since the hazard zone 26*a-b* together with the projective masked regions and shadow regions is preferably already masked for the object recognition. This is unproblematic from a safety engineering aspect since each object 28 is recognized in good time when it approaches the hazard zone 26*a-b*.

However, there are now some demands on the configuration of a hazard zone 26*a-b* for an efficient and safe monitoring. In the example of FIGS. 2 and 3, for instance, a region not visible to the left 3D sensor 10*a* arises at the right side of the hazard zone 26*a* that is marked by an arrow and that is shaded by the hazard zone 26*a*. The configuration of the hazard zones 26*a-b* and of the sensor association of the 3D sensors 10*a-b* must ensure that no object 28 moves into a hazard zone 26*a-b* undetected without a safe reaction in good time. In the case of the critical zone marked with arrows this is satisfied in that here the right 3D sensor 10*b* takes over the monitoring at a perspective more favorable for this purpose.

It will now be explained in the following with reference to FIGS. 4 to 11 which various problematic constellations can occur and how they are solved by a configuration in accordance with the invention. The configuration takes place, for example, in a software tool that represents the scene in a live recording or of a preparation thereof and permits the definition of geometrical structures for hazard zones 26*a-b* in a similar manner to a drawing program or a CAD program. More complex configurations in virtual reality or superposition of a real scene and artificial information (augmented reality) are also conceivable. For reasons of simplicity, common global coordinates are assumed about which the 3D sensors 10*a-b* and the software tool agree. For this purpose, an initial registration or calibration of the 3D sensors 10*a-b* known per se is required to locate the required transformation rules. The 3D sensors 10*a-b* can work in a separate coordinate system in operation, with the configured hazard zones 26*a-b* being converted by means of the transformation acquired during the registration. The 3D sensors 10*a-b* observe the scene from above in each case, for example by installation at the ceiling. This is particularly advantageous, but not absolutely necessary. Different perspectives can also be used in the sensor association to effectively reduce shadow regions.

FIG. 4 shows a schematic side view of the spatial region 12 detected by a 3D sensor 10 having two exemplary hazard zones 26*a-b*. Different possible shortest distances from the hazard zones 26*a-b* and their projective masked regions and shadow regions 34*a-b* resulting from the masking of the hazard zones 26*a-b* are drawn by dashed lines. If the projective shadow region 34*a-b* is left out of consideration in the distance calculation, the distance is underestimated, which possibly results in unnecessary safety reactions and thus in an impairment of availability. Distances should therefore always be calculated directly from the hazard zone 26*a-b* itself. So that no safety problem arises from this, it must then, however, be ensured that an object 28 cannot disappear in the projective shadow region 34*a-b* without previously approaching, noticed by the 3D sensor, to a minimal distance.

The risk through masking is shown again more clearly in FIG. 5. An object 28 will disappear behind the hazard zone

26*a* in its projective shadow region 34*a* on the movement indicated by an arrow from the view of the 3D sensor 10. The distance from the perpendicular outer surface of the hazard zone 26*a* is, however, still very large and possible non-critical. The further critical approach then takes place unnoticed in the projective shadow region 34*a*.

To prevent this, hazard zones 26*a-b* may only be configured in accordance with the invention such that the outer surfaces of the hazard zone 26*a-b* are oriented toward at least one 3D sensor 10 of the monitoring association. The total outer surface should be directly visible to this 3D sensor, in particular without a sight ray through a hazard zone 26*a-b*. No masking by the hazard zone 26*a-b* then results and the 3D sensor 10 can use the shortest distance from the configured hazard zone 26*a-b* without a projective shadow region 34*a-b*.

FIG. 6 shows a three-dimensional view of an example of a hazard zone 26*a* configured in a permitted manner in this sense. The outer surfaces 36 of the hazard zone 26*a* are oriented toward at least one of the 3D sensors 10*a-b* or toward their respective optical centers. The configuration in accordance with the invention mandates such outer surfaces 36 or at least indicates which outer surfaces 36 are permitted, for example by coloring. Further outer surfaces 38 are marked as invalid; for example shown as red or gray. They cannot be safely monitored by the 3D sensors 10*a-b* because they could generate safety critical masking or shadows. The configuring person can change the configuration so that the outer surfaces 38 become visible, either by adapting the outer surfaces 38, the position and/or perspective of one of the 3D sensors 10*a-b*, or by adding a further 3D sensor. The non-visible outer surfaces 38 are otherwise excluded from the monitoring and must be secured in another manner, for instance by a fence or a light grid.

FIG. 7 illustrates in a view similar to FIG. 6 an exemplary correction step of a non-visible outer surface 38. A portion 36*a* of the outer surface 38 is reoriented toward the front, thereby becomes visible to the 3D sensor 10*a*, and is thus permitted for the measurement.

FIG. 8 illustrates in a plan view of the situation of FIG. 7 an embodiment of the configuration in accordance with the invention. In this embodiment, hazard zones 26*a* are configured as a polygonal chain in the floor plane and are provided with a height. A prism having perpendicular side surfaces as the outer surfaces results therefrom. The polygonal chain is not initially limited, but should preferably not overlap itself and can comprise as many sampling points as required so that complex shapes are also possible. There are thus more configuration options than with geometrical primitives such as parallelepipeds, cylinders or spheres that are also conceivable per se. On the other hand, any desired meshes would admittedly be even more flexible, but would only be very difficult to handle both for their fixing and for the checking and understanding of the permissibility in the sense of said visibility criterion.

Generally, that is also for hazard zones 26*a-b* that are not produced as a prism from a polygonal chain, an outer surface of the hazard zone 26*a-b* is visible when the connection line from the 3D sensor 10*a-b* to every point of the outer surface does not intersect any point of a hazard zone 26*a-b*. The orientation of a planar outer surface toward the 3D sensor 10*a-b* can be checked using a normal vector n of the outer surface. The normal vector n always faces outwardly from the hazard zone 26*a-b*. $n \cdot r \leq 0$ must apply to the scalar product for every desired ray r from the 3D sensor 10 to a point on the outer surface to be checked. The connection vector r from the 3D sensor 10 to the surface therefore always faces in the opposite direction to the normal vector n.

This check can be considerably simplified for the preferred embodiment with hazard zones 26*a-b* that are configured as a prism having perpendicular side surfaces from a polygonal chain. A 2D observation in a perpendicular projection onto the base surface such as shown again in FIG. 9 is initially sufficient due to the perpendicular side surfaces. In this projection, n stands perpendicular on the respective observed polygonal segment and r connects the projection of the optical center of the 3D sensor 10 to any desired point of the polygonal segment, for instance its staring point, end point, or center point. The condition for the scalar product remains $n \cdot r \leq 0$, with it now only being a two-dimensional scalar product of the vectors projected onto the base surface. In illustrative terms, the condition means that the 3D sensor 10 is at the other side of the hazard zone 26*a* with respect to a half-plane 40 that is that of the outer surface 36*a* by way of example in FIG. 9. This condition has to be checked using corresponding half-planes 40 for every segment of the polygonal chain.

The check preferably already takes place during the configuration or only valid polygonal chains can be configured. No masking behind hazard zones 26*a-b* is thus possible. This procedure of automatic control has the advantage that only valid configurations can be prepared and released, at least with respect to the visibility of the side surfaces. The automatic check thus precludes these configuration errors.

FIG. 10 again shows an exemplary schematic side view of the field of vision of a 3D sensor 10. A conceivable condition for hazard zones 26*a-b* is that they may admittedly have any desired height, but must always start on the base surface, with this preferably being meant in an expanded sense and permitting a distance of, for example, 300 mm from the ground that is non-critical from a safety engineering aspect. A relevant object 28 can thus not disappear below a hazard zone 26*a-b*.

If a suspended hazard zone 26*a* should nevertheless be configurable, as illustrated in FIG. 10, not only the hazard zone 26*a* itself has to be taken into account for the determination of shortest distances, but also its shadow region 34*a*. Otherwise, as shown, an object 28 could enter into the shadow region 34*a* at a still relatively large distance and approach the hazard zone 26*a* unnoticed therein. For suspended hazard zones 26*a*, the principle is therefore deviated from that it is sufficient to calculate distances from the hazard zone 26*a* itself; the shadow region 34*a* is rather itself to be considered as a part of the hazard zone 26*a* or is alternatively to be secured by means of a further sensor.

Suspended hazard zones 26*a* are therefore often not advantageous. In the situation of FIG. 10, it would probably be better for most applications to draw the hazard zone 26*a* perpendicularly downwardly to the ground as part of the configuration than to virtually project it obliquely over the shadow region 34*a*.

In these considerations, the starting point is as previously a planar base surface, the floor as a rule. It is, however, also conceivable, to place the base surface at a different level or to determine a reference background. Hazard zones 26*a-b* then do no start in the plane of the ground, but rather at the respective height of the reference background.

The shadow regions 34*a* were previously mainly observed behind a hazard zone 26*a* from the view of the 3D sensor 10. However, due to the demand of object-free hazard zones 26*a* and their cutting out in the object detection, a masking also arise between the hazard zone 26*a* and the 3D sensor 10 as a part of the respective masked and shadow region 34*a*.

With perpendicular side surfaces of a hazard zone 26*a*, in particular with a prism having perpendicular side surfaces that are oriented toward at least one 3D sensor 10*a*-*b*, this is, however, surprisingly not safety critical, as FIGS. 11*a*-*b* illustrate. The object 28 approaches toward the hazard zone 26*a*. At the same time as it would disappear in the shadow region 34*a* again, its projective shadow 42, that is counted as part of the object 28 as a precaution, also contacts the hazard zone 26*a*. The critical approach to the shadow region 34*a* is therefore always implicitly noticed and a safety direction reaction takes place in time. It is therefore not possible at all that an object 28 enters into the shadow region 34*a*.

FIG. 12 again illustrates the advantage of the configuration in accordance with the invention. Instead of observing the visibility of outer surfaces of a hazard zone 26*a*-*b*, it would always be possible simply to supplement the hazard zones 26*a*-*b* projectively, that is to add the total shadow regions 34*a*-*b* to them. A comparison of FIGS. 6 and 12 clearly shows how much larger the volume taken up by the hazard zones 26*a*-*b* thereby becomes. This also means that the shortest distances from objects 28 are systematically underestimated and the availability is thus reduced. In addition, such a hazard zone 26*a*-*b* is difficult to understand for the configuring person and complex geometries in space result in the later calculation. Similar problems result when hazard zones 26-*b* are extracted directly from depth maps.

It is conceivable to configure hazard zones 26*a*-*b* automatically with reference to the work routines of the machine 26 or a least to support the configuring person in the configuration with reference to the work routines. For this purpose, the machine 26 is monitored by one of the 3D sensors over one or more worksteps. A monitoring is also conceivable by a different 3D sensor that sees the machine 26 from a better or more complete perspective or by completely different sensors, for instance a robot's own sensor system as a machine 26. The spatial regions are then known that are occupied by the machine 26 at least at times and this information is used to automatically define hazard zones 26*a*-*b* or the information is faded in to illustrate the approximately required hazard zone 26*a*-*b* to the configuring person. It is also conceivable to automatically specify hazard zones 26*a*-*b* and then to post-process them manually.

Specifically, the routine could first provide the recording of 3D point clouds of the static scene as a reference and then during the worksteps of the machine 26 to be monitored, optionally also multiple times. A kind of set union is then formed from this and 3D points of the reference are possibly ignored that are static and that are not part of a hazard. A 3D model is prepared on the basis of this 3D point cloud, in particular a convex envelope together with a projective mask from the sensor view. Alternatively or cumulatively to a consideration of the reference as early as on the plane of the 3D points, a respective 3D model is formed for the worksteps and for the reference and the 3D model is thus cleaned up.

The produced 3D model designates a spatial volume of all points adopted by moving parts of the machine 26. It is subsequently expanded, automatically and/or in a manual post-processing, to form a permitted hazard zone 26*a*-*b* in which all the outer surfaces are visible to at least one 3D sensor 10*a*-*b*. It is in particular conceivable for this purpose to observe a 2D projection of the 3D point cloud and to define a bounding polygonal chain in accordance with the preferred configuration described with reference to FIG. 8.

The invention claimed is:

1. A method of configuring, in a software tool representative of a scene in a live recording, or in preparation thereof, and permitting definition of geometrical structures, at least one hazard zone to be monitored by at least one three-dimensional (3D) sensor, wherein the at least one hazard zone is a volume defined by outer surfaces to secure at least one machine at least partially contained within the at least one hazard zone, wherein a region inside the outer surfaces of the at least one hazard zone is ignored by the at least one 3D sensor, the method comprising:
    fixing the outer surfaces by storing data representative of locations of the outer surfaces in a data record, the outer surfaces being fixed based on inputs from an input device, the data record describing at least one configured hazard zone;
    displaying an image representative of the at least one configured hazard zone on a display;
    automatically checking whether the outer surfaces are directly visible to the at least one 3D sensor, wherein the outer surfaces are determined to be directly visible to the at least one 3D sensor when respective connection lines from the at least one 3D sensor to every point on the outer surfaces do not intersect the at least one hazard zone; and
    indicating that the at least one hazard zone has not been properly configured when the outer surfaces are not determined to be directly visible.

2. The method in accordance with claim 1, wherein at least one polygonal chain is specified on a base surface and a prism having perpendicular outer surfaces is produced therefrom to configure the outer surfaces.

3. The method in accordance with claim 1, wherein the outer surfaces are further determined to be directly visible to the at least one 3D sensor when the at least one 3D sensor is arranged at another side of the at least one hazard zone with respect to a plane in which the outer surfaces are disposed.

4. The method in accordance with claim 1, wherein the at least one hazard zone may only be configured with contact with the ground or, where suspended hazard zones are permitted, a projective shadow region of the at least one hazard zone is counted as part of said at least one hazard zone.

5. The method in accordance with claim 1, wherein one of the outer surfaces that is determined to not be visible to the at least one 3D sensor is marked or is not permitted to be used during the configuration.

6. The method in accordance with claim 5, wherein, on the configuration of one of the outer surfaces that is determined to not be visible to the at least one 3D sensor, an alternative outer surface is automatically suggested.

7. The method in accordance with claim 5, wherein, on the configuration of one of the outer surfaces that is determined to not be visible to the at least one 3D sensor, a changed perspective of a 3D sensor or a perspective of an additional 3D sensor is automatically suggested so that the one of the outer surfaces then becomes visible.

8. The method in accordance with claim 1, wherein the at least one machine is observed during its work movement to locate spatial regions to be covered by the at least one hazard zone.

9. The method in accordance with claim 8, wherein the spatial regions to be covered are represented as aids to configure the at least one hazard zone.

10. The method in accordance with claim 8,
wherein the at least one hazard zone is automatically configured with reference to the spatial regions to be covered.

11. The method in accordance with claim 1,
wherein the at least one configured hazard zone is monitored by the at least one 3D sensor; and wherein objects are detected in an environment of the at least one hazard zone from measured data of the at least one 3D sensor, the shortest distance between the at least one hazard zone and the objects is determined, and a decision is made with its aid as to whether a safety directed reaction of the at least one machine takes place in the at least one hazard zone.

12. The method in accordance with claim 11,
wherein a shortest distance from the outer surfaces is determined without taking account of a projective shadow region of the at least one hazard zone.

13. The method in accordance with claim 11,
wherein objects in the at least one hazard zone itself and in a masked region between the at least one hazard zone and the at least one 3D sensor are ignored in monitoring of the at least one hazard zone.

14. An apparatus for configuring at least one hazard zone to be monitored by at least one three-dimensional (3D) sensor, comprising:
an input device;
at least one 3D sensor;
a display; and
a control and evaluation unit configured to:
fix outer surfaces of the at least one hazard zone based on inputs of the input device, the outer surfaces being fixed by storing data representative of locations of the outer surfaces in a data record, the data record describing at least one configured hazard zone, wherein a region inside the outer surfaces of the at least one hazard zone is ignored by the at least one 3D sensor;
display an image representative of the at least one configured hazard zone on the display, wherein the at least one hazard zone is a volume defined by the outer surfaces to secure at least one machine at least partially contained within the at least one hazard zone;
automatically check, during the configuration of the at least one hazard zone or after the configuration of the at least one hazard zone, whether the outer surfaces are directly visible to the at least one 3D sensor, wherein the outer surfaces are determined to be directly visible to the at least one 3D sensor when respective connection lines from the at least one 3D sensor to every point on the outer surfaces do not intersect the at least one hazard zone; and
indicate that the at least one hazard zone has not been properly configured when the outer surfaces are not determined to be directly visible.

15. A method of configuring, in a software tool representative of a scene in a live recording, or in preparation thereof, and permitting definition of geometrical structures, at least one hazard zone to be monitored by at least one three-dimensional (3D) sensor, wherein the at least one hazard zone is a volume defined by outer surfaces to secure at least one machine at least partially contained within the at least one hazard zone, wherein a region inside the outer surfaces of the at least one hazard zone is ignored by the at least one 3D sensor, the method comprising:
monitoring the at least one hazard zone with the at least one 3D sensor;
detecting at least one object in an environment of the at least one hazard zone from measured data from the at least one 3D sensor;
determining a shortest distance between the at least one hazard zone and the at least one object;
determining whether a safety-related reaction of the at least one machine takes place in the at least one hazard zone;
fixing the outer surfaces by storing data representative of locations of the outer surfaces in a data record, the outer surfaces being fixed based on inputs from an input device, the data record describing at least one configured hazard zone;
displaying an image representative of the at least one configured hazard zone on a display;
automatically checking whether the outer surfaces are directly visible to the at least one 3D sensor, wherein the outer surfaces are determined to be directly visible to the at least one 3D sensor when respective connection lines from the at least one 3D sensor to every point on the outer surfaces do not intersect the at least one hazard zone; and
indicating that the at least one hazard zone has not been properly configured when the outer surfaces are not determined to be directly visible.

\* \* \* \* \*